July 9, 1935.  D. PRINZ  2,007,662
VALVE TRANSMITTER FOR SHORT WAVES
Filed Jan. 4, 1934
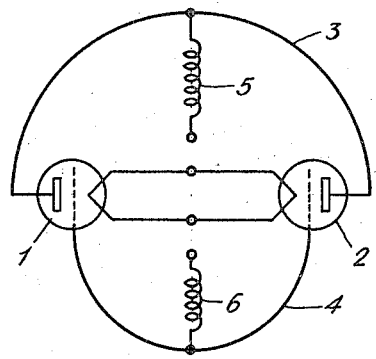
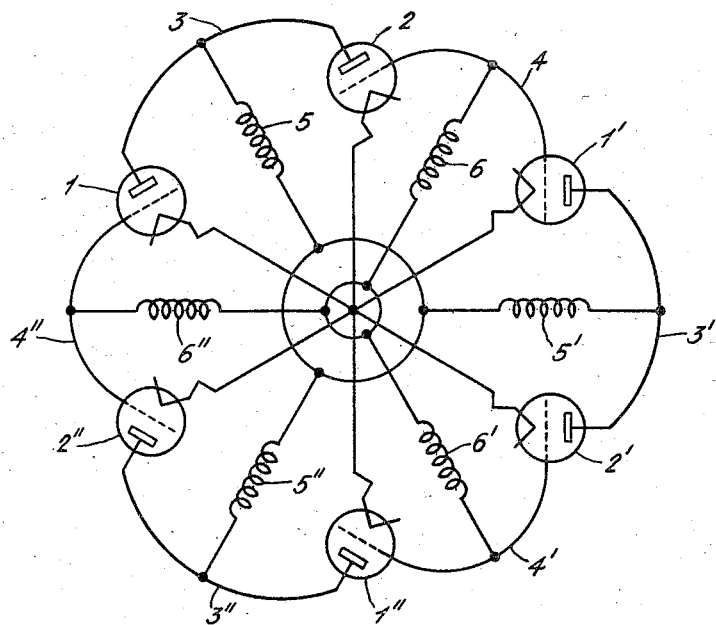
INVENTOR
DIETRICH PRINZ
BY
ATTORNEY Patented July 9, 1935

2,007,662

UNITED STATES PATENT OFFICE 2,007,662

VALVE TRANSMITTER FOR SHORT WAVES

Dietrich Prinz, Berlin, Germany, assignor to Telefunken Gesellschaft für Drahtlose Telegraphie m. b. H., Berlin, Germany, a corporation of Germany Application January 4, 1934, Serial No. 705,242 In Germany January 9, 1933

3 Claims. (Cl. 250—36)

The invention relates to circuit arrangements for the generation of short electrical waves and is a further development of the scheme known to the art as the Holborn circuit. Figure 1 shows the known type of circuit referred to and Figure 2 shows an embodiment of the present invention. Referring to Figure 1, 1 and 2 denote two electron tubes whose plates are interconnected by a clip 3, while the grids thereof are united with each other by clip 4. The inductances of these clips or loops in conjunction with the tube capacities constitute the oscillation circuit. The midpoints of the clips are connected by way of the choke coils 5 and 6 with the plate and the grid voltage source, respectively, not herein shown.

Now, according to the present invention four, six or even a larger even number of tubes are used in a similar circuit arrangement. Figure 2 shows, by way of example, an embodiment comprising six tubes. The tubes are designated by pairs as 1, 2, 1', 2', 1'', 2''. The plates of tubes 1 and 2 are interconnected by means of a clip 3, likewise the plates of tubes 1', 2' by a clip 3', and the plates of tubes 1'', 2'' by a clip 3''.

Between each pair of grids there is also provided a clip, but quite differently from the arrangement shown in Figure 1, the clip is not disposed between the grids of two tubes whose plates are interconnected, but instead between the grids of two tubes which pertain to different pairs. Thus the grids of the tubes 2 and 1' are united by the clip 4, the grids of tubes 2' and 1'' by the clip 4', the grids of the tubes 2'' and 1 by the clip 4''.

The midpoints of the plate connecting clips 3, 3', 3'' are connected by way of choke coils 5, 5', 5'' with the plate potential source, and the midpoints of the grid clips 4, 4', 4'' with the grid voltage source.

All of the cathodes, if desired by way of choke coils (not shown in the drawing) are connected with one another.

The advantages of this circuit scheme are twofold; first, in the addition of the power generated by several individual tubes, and, secondly, in the series connection of both the inductance of the clips as well as the capacities of the tubes with the result that, while the resultant oscillation circuit has the same wave length, the relationship between inductance and capacity is far more favorable than in a transmitter with but two valves.

I claim:

1. In combination, a plurality of pairs of electron discharge devices each device having a grid and anode, the anodes of the tubes of each pair being connected together through a linear connection devoid of lumped inductance and lumped resistance, and the grid of each tube in a pair being connected to the grid of a tube in an adjacent pair through a similar linear connection.

2. In combination, a plurality of pairs of electron discharge devices, each device having a grid and anode, a linear connection devoid of lumped resistance and lumped inductance between the anodes of the devices comprising each pair, and a similar linear connection between the grid of each device in a pair and the grid of another device in an adjacent pair, and individual leads extending from the midpoints of each of said connections to sources of potential.

3. In a transmitter arrangement for the generation of short waves, a plurality of pairs of electron discharge devices, each device having a grid and anode, a linear connection devoid of lumped resistance between the anodes of the devices comprising each pair, and a similar linear connection between the grid of each device in a pair and the grid of another device in an adjacent pair, and individual leads extending from the midpoints of each of said connections to sources of potential, and a choke coil in each of said leads.

DIETRICH PRINZ.